(12) United States Patent
Niu et al.

(10) Patent No.: US 9,426,065 B2
(45) Date of Patent: Aug. 23, 2016

(54) METHOD, APPARATUS AND SYSTEM FOR IMPLEMENTING ROUTING AGGREGATION

(71) Applicant: Huawei Technologies Co., Ltd., Shenzhen (CN)

(72) Inventors: Lehong Niu, Shenzhen (CN); Shuxiang Wang, Shenzhen (CN); Min Zha, Shenzhen (CN); Fuqing Huang, Shenzhen (CN); Yuxu Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 458 days.

(21) Appl. No.: 13/800,606

(22) Filed: Mar. 13, 2013

(65) Prior Publication Data

US 2013/0272306 A1 Oct. 17, 2013

Related U.S. Application Data

(63) Continuation of application No. PCT/CN2011/075152, filed on Jun. 23, 2011.

(30) Foreign Application Priority Data

Sep. 26, 2010 (CN) .......................... 2010 1 0291893

(51) Int. Cl.
  *H04L 12/56* (2006.01)
  *H04L 12/741* (2013.01)
  (Continued)

(52) U.S. Cl.
  CPC ......... *H04L 45/74* (2013.01); *H04L 29/12915* (2013.01); *H04L 45/04* (2013.01);
  (Continued)

(58) Field of Classification Search
  None
  See application file for complete search history.

(56) References Cited

U.S. PATENT DOCUMENTS

2005/0027834 A1  2/2005 Chen et al.
2009/0106385 A1  4/2009 Sarikaya et al.
(Continued)

FOREIGN PATENT DOCUMENTS

CN  101110817 A  1/2008
CN  101335697 A  12/2008
(Continued)

OTHER PUBLICATIONS

Written Opinion of the International Searching Authority issued in corresponding PCT Patent Application No. PCT/CN2011/075152, mailed Sep. 29, 2011.
(Continued)

*Primary Examiner* — Huy D Vu
*Assistant Examiner* — Teisha D Hall
(74) *Attorney, Agent, or Firm* — Brinks Gilson & Lione

(57) ABSTRACT

The embodiments of the present invention disclose a method, apparatus and system for implementing routing aggregation, which relate to communication field, and solve the problem that too many routings advertised on the DHCPv6 relay agent leads to huge number of routing table entries of the backbone network. The technical solution of the present invention comprises: sending a message to a dynamic host configuration protocol DHCPv6 relay agent, such that the DHCPv6 relay agent generates an aggregation routing of requesting router prefix routings according to the message; wherein the message comprises information about a prefix pool which assigns address prefixes to the requesting routers access to the DHCPv6 relay agent or aggregation routing destination address information generated according to the information about the prefix pool. The method, apparatus and system for implementing routing aggregation may be applied in DHCPv6 network constructions.

16 Claims, 16 Drawing Sheets

BRAS: broadband remote access server
DHCPv6 Relay Agent: DHCPv6 relay agent
AN: access node
Lightweight DHCPv6 Relay Agent: lightweight relay agent
RG: residential gateway
Requesting router: requesting router
Subscriber PC: subscriber personal computer

(51) Int. Cl.
 H04L 29/12 (2006.01)
 H04L 12/715 (2013.01)
(52) U.S. Cl.
 CPC .......... *H04L 45/54* (2013.01); *H04L 61/2015* (2013.01); *H04L 61/2061* (2013.01); *H04L 61/6059* (2013.01); *H04L 61/6068* (2013.01)

(56) References Cited

U.S. PATENT DOCUMENTS

2009/0225761 A1  9/2009  Sarikaya et al.
2009/0257439 A1  10/2009  Xu

FOREIGN PATENT DOCUMENTS

| CN | 101626406 A | 1/2010 |
| CN | 101984636 A | 3/2011 |
| WO | WO 2009/052759 A1 | 4/2009 |
| WO | WO 2010/086830 A3 | 8/2010 |

OTHER PUBLICATIONS

Sarikaya et al., "DHCPv6 Prefix Delegation as IPv6 Migration Tool in Cellular Networks" Network Working Group, Feb. 16, 2010, 13 pages.
Sarikaya et al., "Flexible DHCPv6 Prefix Delegation in Mobile Networks" Network Working Group, May 10, 2010, 15 pages.
International Search Report issued in corresponding PCT Patent Application No. PCT/CN2011/075152, mailed Sep. 29, 2011.
Droms et al., "DHCPv6 Relay Agent Assignment Notification (RAAN) Option" dhc Group Internet Draft, Jul. 13, 2009.
Droms et al., "Dynamic Host Configuration Protocol for IPv6 (DHCPv6)" Network Working Group, Jul. 2003.
Miles, Ed. et al., "Lightweight DHCPv6 Relay Agent" DHC Working Group, Jun. 8, 2010.
Troan et al., "IPv6 Prefix Options for Dynamic Host Configuration Protocol (DHCP) version 6" Network Working Group, Dec. 2003.
Yeh et al., "Prefix Pool Option for DHCPv6 Relay Agent" IETF 80—DHC, Mar. 31, 2011.
Yeh et al., "Prefix Pool Option for DHCPv6 Relay Agent" IETF 80 — DHC, Mar. 31, 2011.

sending a message to a DHCPv6 relay agent, such that the DHCPv6 relay agent generates an aggregation routing of requesting router prefix routings according to the message; wherein the message comprises information about a prefix pool which assigns address prefixes to the requesting routers access to the DHCPv6 relay agent or aggregation routing destination address information generated according to the information about the prefix pool /201

Figure 2 receiving a message, wherein the message comprises information about a prefix pool which assigns address prefixes to the requesting routers access to the DHCPv6 relay agent or aggregation routing destination address information generated according to the information about the prefix pool /301 generating an aggregation routing of requesting router prefix routings according to the message /302

Figure 3

BRAS: broadband remote access server
DHCPv6 Relay Agent: DHCPv6 relay agent
AN: access node
Lightweight DHCPv6 Relay Agent: lightweight relay agent
RG: residential gateway
Requesting router: requesting router
Subscriber PC: subscriber personal computer BRAS: broadband remote access server
DHCPv6 Relay Agent: DHCPv6 relay agent
Ethernet Aggregation Network: ethernet aggregation network
Lightweight DHCPv6 Relay Agent: lightweight relay agent
RG: residential gateway
Requesting router: requesting router
Subscriber PC: subscriber personal computer

| | | |
|---|---|---|
| RG to AN: | REQUE-ST | OPTION_IA_PD:<br>OPTION_IAPREFIX:<br>  Prefix = 0::/56 |

| | | |
|---|---|---|
| AN to BRAS: | RELAY-FORW | OPTION_RELAY_MSG:<br>REQUEST<br>OPTION_INTERFACE_ID:<br>AN_id, frame/slot/port |

| | | |
|---|---|---|
| BRAS to DHCP Server: | RELAY-FORW | OPTION_RELAY_MSG:<br>RELAY-FORW<br>OPTION_INTERFACE_ID:<br>BRAS_id, frame/slot/port |

| | | |
|---|---|---|
| DHCP Server to BRAS: | RELAY-REPL | OPTION_RELAY_MSG:<br>RELAY-REPL |

| | | |
|---|---|---|
| BRAS to AN: | RELAY-REPL | OPTION_RELAY_MSG:<br>REPLY |

| | | |
|---|---|---|
| AN to RG: | REPLY | OPTION_IA_PD:<br>OPTION_IAPREFIX:<br>  Prefix = 2001:0EFF:1B00:0100::/56 |

Figure 4(d)

| | | |
|---|---|---|
| RG to AN: | REQUE-ST | OPTION_IA_PD:<br>OPTION_IAPREFIX:<br>Prefix = 0::/56 |

| | | |
|---|---|---|
| AN to BRAS: | RELAY-FORW | OPTION_RELAY_MSG:<br>REQUEST<br>OPTION_INTERFACE_ID:<br>AN_id, frame/slot/port |

| | | |
|---|---|---|
| BRAS to DHCP Server: | RELAY-FORW | OPTION_RELAY_MSG:<br>RELAY-FORW<br>OPTION_INTERFACE_ID:<br>BRAS_id, frame/slot/port |

| | | |
|---|---|---|
| DHCP Server to BRAS: | RELAY-REPL | OPTION_RELAY_MSG:<br>RELAY-REPL |

| | | |
|---|---|---|
| BRAS to AN: | RELAY-REPL | OPTION_RELAY_MSG:<br>REPLY |

| | | |
|---|---|---|
| An to RG | REPLY | OPTION_IA_PD:<br>OPTION_IAPREFIX:<br>Prefix = 2001:0EFF:1B00:0100::/56<br>OPTION_PREFIX_POOL:<br>Prefix pool=2001:0EFF:1B00::/40 |

Figure 7(a)

| | | |
|---|---|---|
| RG to AN: | REQUEST | OPTION_IA_PD:<br>OPTION_IAPREFIX:<br>  Prefix = 0::/56 |

| | | |
|---|---|---|
| AN to BRAS: | RELAY-FORW | OPTION_RELAY_MSG:<br>REQUEST<br>OPTION_INTERFACE_ID:<br>AN_id, frame/slot/port |

| | | |
|---|---|---|
| BRAS to DHCP Server: | RELAY-FORW | OPTION_RELAY_MSG:<br>RELAY-FORW<br>OPTION_INTERFACE_ID:<br>BRAS_id, frame/slot/port<br>OPTION_ORO:<br>OPTION_AGENT_NOTIFY |

| | | |
|---|---|---|
| DHCP Server to BRAS: | RELAY-REPL | OPTION_RELAY_MSG:<br>RELAY-REPL<br>OPTION_AGENT_NOTIFY:<br>OPTION_IAPREFIX:<br>  Prefix = 2001:0EFF:1B00:0100::/56<br>OPTION_PREFIX_POOL:<br>  Prefix pool=2001:0EFF:1B00::/40 |

| | | |
|---|---|---|
| BRAS to AN: | RELAY-REPL | OPTION_RELAY_MSG:<br>REPLY |

| | | |
|---|---|---|
| AN to RG: | REPLY | OPTION_IA_PD:<br>OPTION_IAPREFIX:<br>  Prefix = 2001:0EFF:1B00:0100::/56 |

Figure 7(b)

| | | |
|---|---|---|
| RG to AN: | REQUE-ST | OPTION_IA_PD:<br>OPTION_IAPREFIX;<br> Prefix = 0::/56 |

| | | |
|---|---|---|
| AN to BRAS: | RELAY-FORW | OPTION_RELAY_MSG:<br>REQUEST<br>OPTION_INTERFACE_ID:<br>AN_id, frame/slot/port |

| | | |
|---|---|---|
| BRAS to DHCP Server: | RELAY-FORW | OPTION_RELAY_MSG:<br>RELAY-FORW<br>OPTION_INTERFACE_ID:<br>BRAS_id, frame/slot/port<br>OPTION_ORO:<br>OPTION_RA_ROUTE_NOTIFY |

| | | |
|---|---|---|
| DHCP Server to BRAS: | RELAY-REPL | OPTION_RELAY_MSG:<br>RELAY-REPL<br>OPTION_RA_ROUTE_NOTIFY:<br>2001:0EFF:1B00::/40 |

| | | |
|---|---|---|
| BRAS to AN: | RELAY-REPL | OPTION_RELAY_MSG:<br>REPLY |

| | | |
|---|---|---|
| AN to RG: | REPLY | OPTION_IA_PD;<br>OPTION_IAPREFIX;<br> Prefix = 2001:0EFF:1B00:0100::/56 |

Figure 7(c)

METHOD, APPARATUS AND SYSTEM FOR IMPLEMENTING ROUTING AGGREGATION

CROSS-REFERENCE TO RELATED APPLICATIONS

This application is a continuation of International Application No. PCT/CN2011/075152, filed on Jun. 23, 2011, which claims priority to Chinese Patent Application No. 201010291893.1 filed on Sep. 26, 2010, both of which are hereby incorporated by reference in their entireties.

FIELD OF THE INVENTION

The present invention relates to communication technologies, and more particularly, to a method, apparatus and system for implementing routing aggregation.

BACKGROUND OF THE INVENTION

As shown in FIG. 1, typical network construction for assigning Internet Protocol version 6 (IPv6) address prefix by DHCPv6 PD (Dynamic Host Configuration Protocol version 6 Prefix Delegation) includes a residential gateway (RG) or a customer premise equipment (CPE). The RG or CPE serves as a requesting router, and connects a home network of a subscriber and an external network service provider (NSP) network. The RG or CPE is connected with an access node (AN), which serves as a DHCPv6 lightweight relay agent, by various access technologies, such as digital subscriber line (DSL) and passive optical network (PON) technologies. Multiple ANs are connected to a broadband remote access server (BRAS) or a broadband network gateway (BNG) device. The BRAS or BNG serves as a DHCPv6 relay agent, and is connected to the network of NSP. A DHCPv6 server, which is configured in the NSP network, are used for assigning IPv6 addresses or IPv6 address prefixes for requesting routers. A prefix pool, which is used for assigning IPv6 address prefixes for requesting routers by DHCPv6 PD, is configured on the DHCPv6 server. The prefix pool is a set of IPv6 address prefixes. For example, a prefix pool is 2001:0EFF:1B00::/40 and a prefix length of each prefix in the prefix pool is 56, then the prefix pool is a set of 65535 prefixes of prefix/56 from 2001:0EFF: 1B00:0100::/56 to 2001:0EFF:1BFF:FF00::/56.

By taking BRAS as an example, in order to guarantee that a message received from the network is enable to be correctly routed to a subscriber computer in home network, for each IPV6 prefix which is assigned to a RG by a DHCP server in the DHCP PD way, an indirect routing named as a requesting router prefix routing, with the IPV6 prefix as a destination address, is needed to be established on the BRAS. For example, a prefix pool is 2001:0EFF:1B00:/40 and a prefix length of each prefix in the prefix pool is 56, then 65535 prefixes of prefix/56 from 2001:0EFF:1B00: 0100::/56 to 2001:0EFF:1BFF:FF00::/56 are able to be assigned in total. In case all the prefixes of the prefix pool are assigned, 65535 requesting router prefix routings whose prefix lengths are 56 are needed to be established on the BRAS. A requesting router prefix routing table established on the BRAS is depicted in table 1, in which a destination address of a requesting router prefix routing is an assigned address prefix, a next hop address is a WAN port address of a RG and an output interface is a communication interface between the BRAS and the RG.

TABLE 1

BRAS routing table

| Destination Address | Next Hop Address | Interface |
| --- | --- | --- |
| 2001:0EFF:1B00:0100::/56 | RG1 WAN port address | Communication interface between BRAS and RG1 |
| 2001:0EFF:1B00:0200::/56 | RG2 WAN port address | Communication interface between BRAS and RG2 |
| ... | | |
| 2001:0EFF:1BFF:FF00::/56 | RGn WAN port address | Communication interface between BRAS and RGn |

In order to guarantee a correct routing of a message with the above prefix as a destination address, the BRAS needs to advertise the above routing information to the network by a routing protocol. The requesting router prefix routing information advertised by the BRAS in the network is shown as in table 2, in which a destination address of a requesting router prefix routing is an assigned address prefix and a next hop address is a BRAS network side interface address.

TABLE 2

Requesting router prefix routing information advertised by the BRAS in the network

| Destination Address | Next Hop Address |
| --- | --- |
| 2001:0EFF:1B00:0100::/56 | A BRAS network side interface address |
| 2001:0EFF:1B00:0200::/56 | A BRAS network side interface address |
| ... | |
| 2001:0EFF:1BFF:FF00::/56 | A BRAS network side interface address |

In the prior implementing methods, a BRAS needs to advertise tens of thousands of requesting router prefix routings to a RG in the network by routing protocol, and too many routings advertised on the BRAS leads to huge number of routing table entries in a backbone network in the prior art.

SUMMARY OF THE INVENTION

The method, apparatus and system for implementing routing aggregation provided by the embodiments of the present invention, are used for resolving the problem that too many routings advertised on a DHCPv6 relay agent router leads to huge number of routing table entries in a backbone network in the prior art.

In order to achieve the above-mentioned purpose, the embodiments of the present invention adopt the following technical solutions:

A method for implementing routing aggregation, comprising: sending a message to a dynamic host configuration protocol DHCPv6 relay agent, such that the DHCPv6 relay agent generates an aggregation routing of requesting router prefix routings according to the message; wherein the message comprises information about a prefix pool which assigns address prefixes to the requesting routers access to the DHCPv6 relay agent or aggregation routing destination address information generated according to the information about the prefix pool.

A method for implementing routing aggregation, comprising: receiving a message, wherein the message comprises information about a prefix pool which assigns address prefixes to the requesting routers access to the DHCPv6 relay agent or aggregation routing destination address information generated according to the information about the prefix pool; and generating an aggregation routing of requesting router prefix routings according to the message.

A network communication apparatus, comprising: a first sending unit, configured to send a message to a dynamic host configuration protocol DHCPv6 relay agent, wherein the message comprises information about a prefix pool which assigns address prefixes to the requesting routers access to the DHCPv6 relay agent or aggregation routing destination address information generated according to the information about the prefix pool.

An apparatus for implementing routing aggregation, comprising: a fourth receiving unit, configured to receive a message, wherein the message comprises information about a prefix pool which assigns address prefixes to the requesting routers access to the DHCPv6 relay agent or aggregation routing destination address information generated according to the information about the prefix pool; and an aggregation unit, configured to generate an aggregation routing of requesting router prefix routings according to the reply message received by the receiving unit.

A system for implementing routing aggregation, comprising: a network communication apparatus, configured to send a message to a dynamic host configuration protocol DHCPv6 relay agent, wherein the message comprises information about a prefix pool which assigns address prefixes to the requesting routers access to the DHCPv6 relay agent or aggregation routing destination address information generated according to the information about the prefix pool; and a dynamic host configuration protocol DHCPv6 relay agent, configured to receive a message, and generating an aggregation routing of requesting router prefix routings according to the message sent by the network communication apparatus.

The method, apparatus and system for implementing routing aggregation provided by the embodiments of the present invention, as the message comprises information about a prefix pool which assigns address prefixes to the requesting routers access to the DHCPv6 relay agent or aggregation routing destination address information generated according to the information about the prefix pool, and an aggregation routing of requesting router prefix routings is generated according to the information about the prefix pool or the aggregation routing destination address information, the number of routings advertised on the DHCPv6 relay agent router has been greatly reduced and the problem that too many routings advertised on the DHCPv6 relay agent router leads to huge number of routing table entries in a backbone network in the prior art has been solved.

BRIEF DESCRIPTION OF THE DRAWINGS

In order to describe the technical solution in the embodiments of the present invention or the one in the prior art more clearly, a brief introduction on the drawings which are needed in the embodiments is given below. Obviously, the drawings in the description below are only some of the embodiments of the present invention, based on which other drawings may be obtained by a person having ordinary skill in the art without any inventive efforts.

FIG. 2 is a flowchart of a method for implementing routing aggregation provided by an embodiment of the present invention;

FIG. 3 is a flowchart of a method for implementing routing aggregation provided by another embodiment of the present invention;

FIG. 4(d) illustrates exemplary messages of a DHCP PD process corresponding to FIG. 4(a);

FIG. 7(a) illustrates exemplary message of a DHCP PD process corresponding to FIG. 6(a);

FIG. 7(b) illustrates exemplary messages of a DHCP PD process corresponding to FIG. 6(b);

FIG. 7(c) illustrates exemplary messages of a DHCP PD process corresponding to FIG. 6(c);

DETAILED DESCRIPTION OF THE INVENTION

Figure 1:
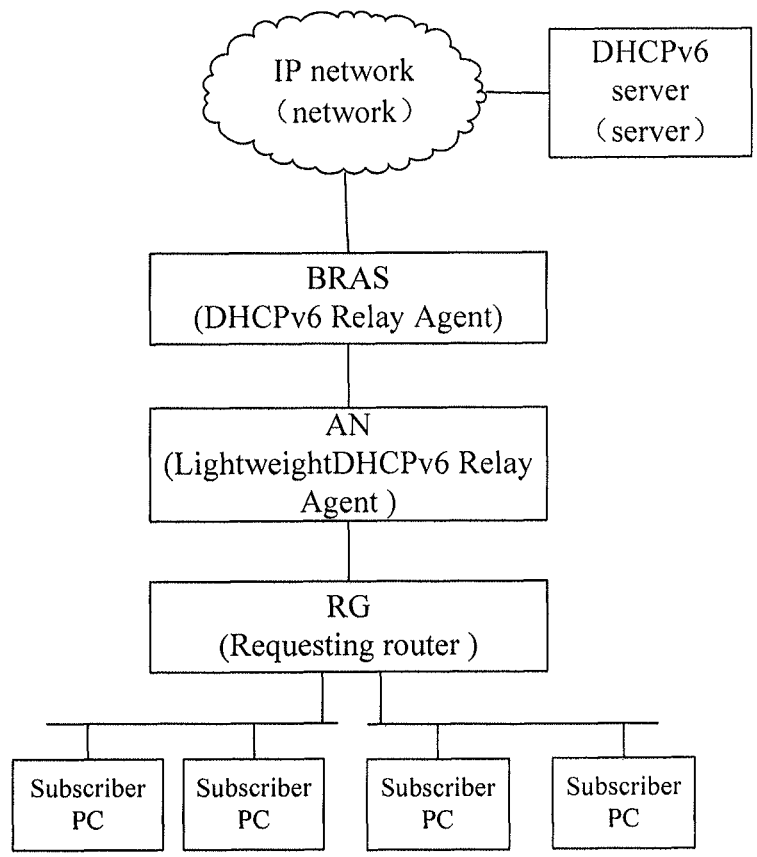
FIG. 1 is a typical network construction diagram of assigning IPv6 address prefixes by a DHCPv6 PD.

The specific implementing processes of the present invention are illustrated through embodiments hereinafter. Apparently, the described embodiments are merely part rather than all of the embodiments of the present invention. Based on the embodiments of the present invention, all other embodiments obtained by a person having ordinary skill in the art without making creative efforts fall within the protection scope of the present invention.

In order to solve the problem that too many routings advertised on the DHCPv6 relay agent router leads to huge number of routing table entries in a backbone network in the prior art, the embodiments of the present invention provide a method, apparatus and system for implementing routing aggregation.

As shown in FIG. 2, a method for implementing routing aggregation provided by the embodiments of the present invention, comprising:

Step 201, sending a message to a DHCPv6 relay agent, such that the DHCPv6 relay agent generates an aggregation routing of requesting router prefix routings according to the message; wherein the message comprises information about a prefix pool which assigns address prefixes to the requesting routers access to the DHCPv6 relay agent, or comprises aggregation routing destination address information generated according to the information about the prefix pool.

In the present embodiment, the message may be sent by a DHCPv6 server, and may also be sent by a network management system (NMS). The relay agent may be a BRAS and may also be a BNG, or be a router with a DHCPv6 relay agent.

The information about the prefix pool includes prefix length of the prefix pool and IPv6 prefix of the prefix pool; the aggregation routing destination address information includes prefix length of the aggregation routing destination address and prefix of the aggregation routing destination address, and the aggregation routing destination address information may be generated according to the information about the prefix pool and may also be generated according to part of the information about the prefix pool.

In the present embodiment, a specific method that the DHCPv6 relay agent generates an aggregation routing of the requesting router prefix routings according to the message is that the DHCPv6 relay agent generates a destination address of the aggregation routing according to the information about the prefix pool or the aggregation routing destination address information in the message, and generates a next hop address of the aggregation routing according to the DHCPv6 relay agent network side interface address.

When a prefix pool is shared by RGs under a single BRAS, the prefix of the aggregation routing destination address is the prefix of the prefix pool, and the aggregation routing destination address information that the DHCP server responds to the BRAS is the information about the prefix pool. For example, a prefix pool of 2001:0EFF: 1B00::/40 is shared by RGs under a single BRAS, then the aggregation routing destination address information that the DHCP server responds to the BRAS is 2001:0EFF:1B00::/40.

When a prefix pool is shared by RGs under plural BRASs, the aggregation routing destination address information that the DHCP server responds to the BRASs may not be the information about the prefix pool and may be part of the information about the prefix pool. For example, a prefix pool of 2001:0EFF:1B00::/40 is shared by RGs under two BRASs, then the prefix pool of 2001:0EFF:1B00::/40 may be divided into two parts:

2001:0EFF:1B00:0100::/56~2001:0EFF:1BFF:FF00::/56; and

2001:0EFF:1B80:0100::/56~2001:0EFF:1BFF:FF00::/56, and each of the parts is assigned to different BRAS, then the aggregation routing destination address information that the DHCP server responds to the BRASs are 2001:0EFF: 1B00::/41 and 2001:0EFF:1B80::/41.

The method for implementing routing aggregation provided by the embodiments of the present invention, as the message comprises information about a prefix pool which assigns address prefixes to the requesting routers access to the DHCPv6 relay agent or aggregation routing destination address information generated according to the information about the prefix pool, and an aggregation routing of requesting router prefix routings is generated according to the information about the prefix pool or the aggregation routing destination address information, the number of routings advertised on the DHCPv6 relay agent router has been greatly reduced and the problem that too many routings advertised on the DHCPv6 relay agent router leads to huge number of routing table entries in a backbone network in the prior art has been solved.

As shown in FIG. 3, a method for implementing routing aggregation provided by another embodiment of the present invention, comprising:

Step 301, receiving a message, wherein the message comprises information about a prefix pool which assigns address prefixes to the requesting routers access to the DHCPv6 relay agent or aggregation routing destination address information generated according to the information about the prefix pool.

In the present embodiment, the message is received by the DHCPv6 relay agent, and the relay agent may be a BRAS or may also be a BNG, or be a router with a DHCPv6 relay agent. The information about the prefix pool or the aggregation routing destination address information is as described in the above-mentioned embodiment and will not be described in detail herein.

Step 302, generating an aggregation routing of requesting router prefix routings according to the message.

In the present embodiment, a specific method that the DHCPv6 relay agent generates an aggregation routing of the requesting router prefix routings according to the message is that the DHCPv6 relay agent generates a destination address of the aggregation routing according to the information about the prefix pool or the aggregation routing destination address information in the message, and generates a next hop address of the aggregation routing according to the DHCPv6 relay agent network side interface address.

For example, a prefix length of each prefix in the prefix pool of 2001:0EFF:1B00::/40 is 56, and in case all the prefixes of the prefix pool are assigned, 65535 routings whose prefix lengths are 56 are needed to be established on the BRAS, and the BRAS routing table is as depicted in table 1.

In order to guarantee a correct routing of a message with the above prefix as destination address, the BRAS needs to advertise the above routing information to the network by routing protocol. By adopting the method of the present invention, the BRAS advertises the routing information as shown in table 3 to the network, rather than adveretising the routing information as shown in table 2 to the network in the prior art, so as to achieve the purpose of aggregating 65535 prefix/56 routings as in the prior art.

TABLE 3

| The routing information advertised to the network by the BRAS: | |
|---|---|
| Destination Address | Next Hop Address |
| 2001:0EFF:1B00::/40 | A BRAS network side interface address |

The method for implementing routing aggregation provided by the embodiments of the present invention, as the message comprises information about a prefix pool which assigns address prefixes to the requesting routers access to the DHCPv6 relay agent or aggregation routing destination address information generated according to the information about the prefix pool, and an aggregation routing of requesting router prefix routings is generated according to the information about the prefix pool or the aggregation routing destination address information, the number of routings advertised on the DHCPv6 relay agent router has been greatly reduced and the problem that too many routings advertised on the DHCPv6 relay agent router leads to huge number of routing table entries in a backbone network in the prior art has been solved.

In order to enable the skilled person to understand the technical solution provided in the embodiments of the present invention more clearly, the method for implementing routing aggregation provided by the embodiments of the present invention is described in detail through a specific embodiment hereinafter.

In order to make it easier to understand for the skilled person, the assignment of IPv6 address prefixes by DHCPv6 PD is described in detail herein.

Figure 4A:
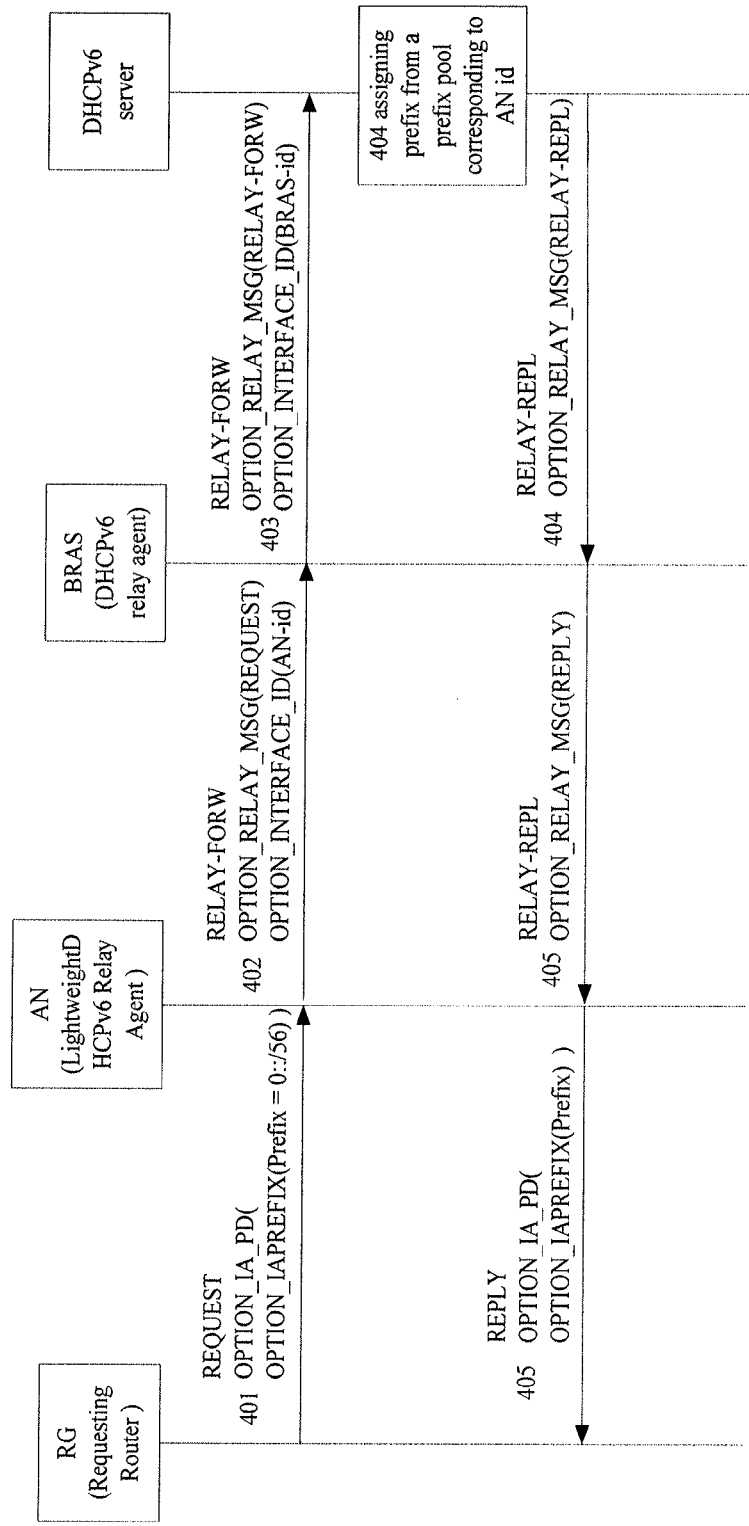
FIG. 4(a) is a message flowchart of assigning IPv6 address prefixes by DHCPv6 PD.

As shown in FIG. 4(a), the assignment of IPv6 address prefixes by DHCPv6 PD comprising:

Step 401, as a requesting router, a RG sends a request (REQUEST) message, wherein the message carries a first OPTION_IA_PD (Identity Association for Prefix Delegation) option which is used for requesting an address prefix.

Step 402, as a lightweight DHCPv6 relay agent (Lightweight DHCPv6 Relay Agent), an AN receives the REQUEST message and establishes a first relay forwarding (RELAY-FORW) message, wherein the content of the first OPTION_RELAY_MSG option in the first relay forwarding (RELAY-FORW) message is the received REQUEST message, and the content of the first OPTION_INTERFACE_ID option is information such as an AN identification, and a frame, slot as well as port number for receiving a message; and the AN sends the first relay forwarding (RELAY-FORW) message.

Step 403, as a DHCPv6 relay agent (DHCPv6 Relay Agent), a BRAS receives the first relay forwarding (RELAY-FORW) message and establishes a second relay forwarding (RELAY-FORW) message, wherein the content of a second OPTION_RELAY_MSG option in the second relay forwarding (RELAY-FORW) message is the received first relay forwarding (RELAY-FORW) message, and the content of a second OPTION_INTERFACE_ID option is information such as a BRAS identification, and a frame, slot as well as port number for receiving a message; and the BRAS sends the second relay forwarding (RELAY-FORW) message.

Step 404, a DHCP server receives the second relay forwarding (RELAY-FORW) message sent by the BRAS, and parses the second relay forwarding (RELAY-FORW) message; if the REQUEST message comprises a first OPTION_IA_PD option indicating that an address prefix is needed to be assigned. The DHCP server assigns the address prefix from the prefix pool corresponding to the AN identification carried in the first OPTION_INTERFACE_ID option; generates an OPTION_IAPREFIX option according to the assigned address prefix which serves as the content of the OPTION_IAPREFIX option, and generates a second OPTION_IA_PD option according to the OPTION_IAPREFIX option in which the whole OPTION_IAPREFIX serves as the content of the second OPTION_IA_PD option, and generates a reply (REPLY) message according to the second OPTION_IA_PD option, then encapsulates the reply (REPLY) message, and continues to encapsulate the reply (REPLY) message twice as a relay reply (RELAY-REPL) message.

Step 405, the BRAS and the AN parse the relay reply (RELAY-REPL) message, and finally the RG receives a reply (REPLY) message. The RG assigns an IPv6 address for a subscriber of home network according to the address prefix carried in the RAPLY message.

Figure 4B:
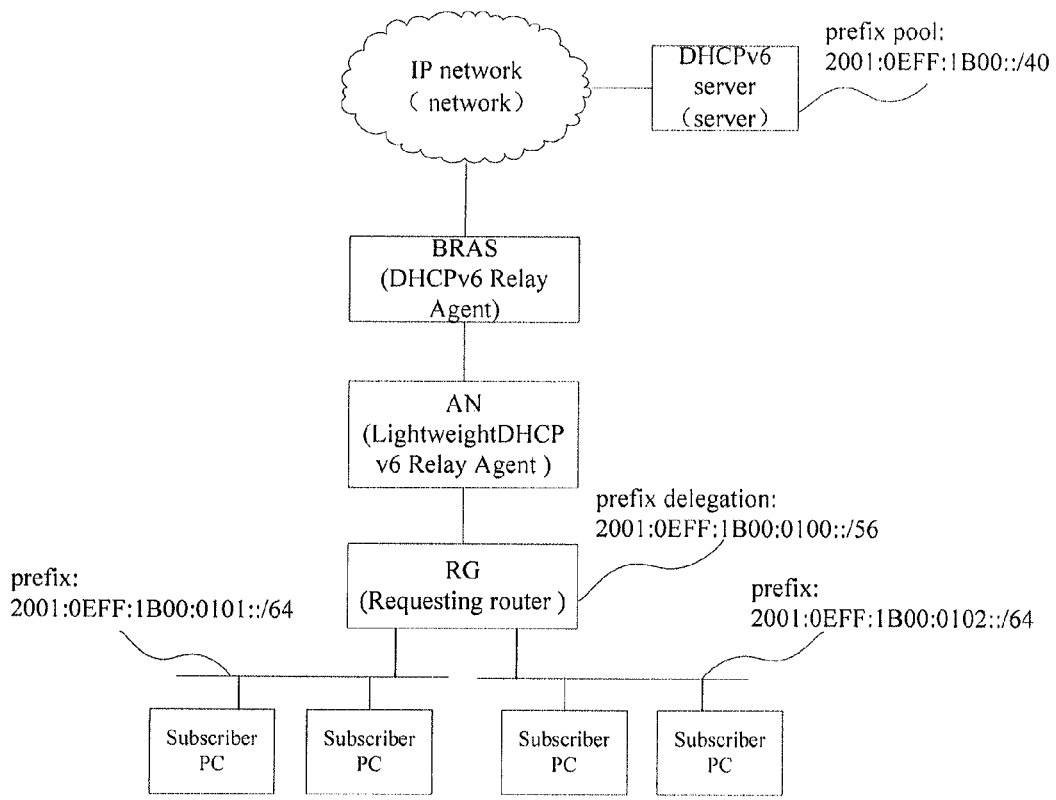
FIG. 4(b) is a network construction diagram of assigning IPv6 address prefixes by DHCPv6 PD, which implements address prefix assignment according to the message flowchart of assigning IPv6 address prefixes by DHCPv6 PD as shown in FIG. 4(a)
Figure 4C:
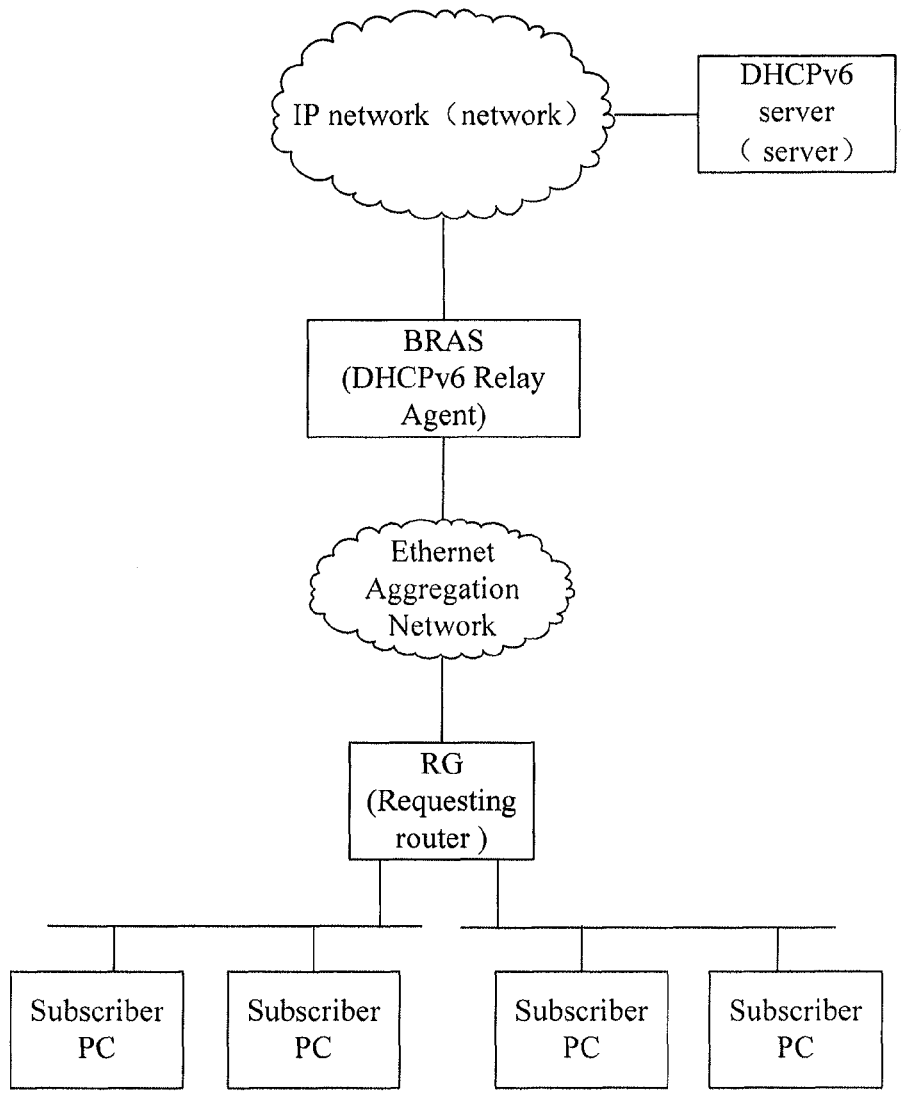
FIG. 4(c) is a network construction diagram of assigning IPv6 address prefixes by DHCPv6 PD.

Specifically, as shown in FIG. 4(b), after receiving the second relay forwarding (RELAY-FORW) message and parsing the second relay forwarding (RELAY-FORW) message, the DHCP server obtains the request message and the identification of the AN forwarding the request message. The DHCP server obtains the prefix pool corresponding to the AN identification according to the AN identification, and the prefix of the prefix pool is 2001:0EFF:1B00::/40, the prefix length of each prefix in the prefix pool is 56, then 65535 prefixes of prefix/56 from 2001:0EFF:1B00:0100::/56 to 2001:0EFF:1BFF:FF00::/56 is able to be assigned in total. The prefix value returned from the DHCP server to the RG is 2001:0EFF:1B00:0100::/56. The RG splits the prefix into 255 prefixes of prefix/64 from 2001:0EFF:1B00:0101::/64 to 2001:0EFF:1B00:01FF::/64, from which one prefix of prefix/64 is assigned for each subnetwork of the home network. Exemplary messages of the whole DHCP PD process are as depicted in FIG. 4(c).

In case all the prefixes of the prefix pool are assigned, 65535 routings of prefix/56 are needed to be established on the BRAS, and the routing table on the BRAS is depicted in table 1.

It should be noted that besides determining to assign address prefixes from the corresponding prefix pool according to the AN information (such as AN identification, frame, slot and port number) which is carried in the first OPTION_INTERFACE_ID added on the AN, the DHCP server may also determine to assign address prefixes from the corresponding prefix pool according to the BRAS information (such as BRAS identification, frame, slot and port number) which is carried in the second OPTION_INTERFACE_ID added by the BRAS. As shown in FIG. 4(d), in the condition of implementing the DHCP relay agent only on the BRAS, the DHCP server may determine to assign address prefixes from the corresponding prefix pool according to the BRAS information (such as BRAS identification, frame, slot and port number) which is carried in the second OPTION_INTERFACE_ID added by the BRAS.

Figure 5A:
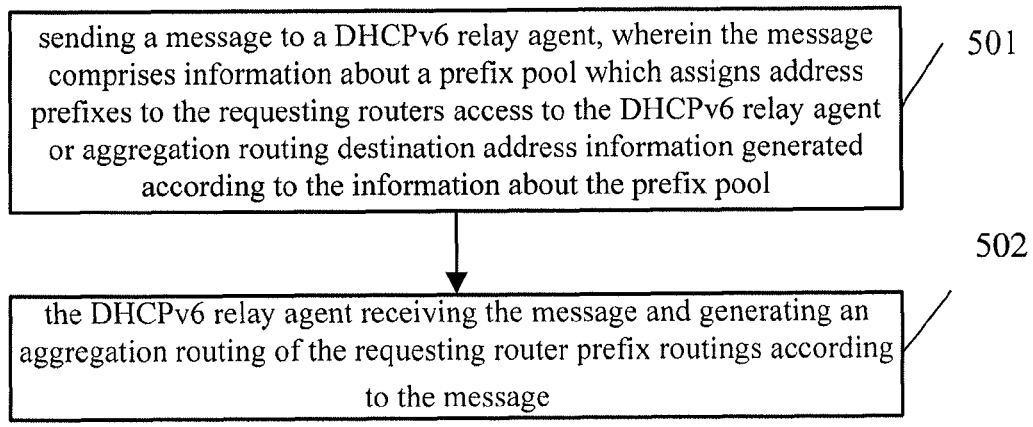
FIG. 5(a) is flowchart one of a method for implementing routing aggregation provided by another embodiment of the present invention.

In order to reduce the number of pieces of routing information that the DHCP relay agent advertises in the network, as shown in FIG. 5(a), a method for implementing routing aggregation provided by another embodiment of the present invention, comprising:

Step 501, sending a message to a DHCPv6 relay agent, wherein the message comprises information about a prefix pool which assigns address prefixes to the requesting routers access to the DHCPv6 relay agent or aggregation routing destination address information generated according to the information about the prefix pool.

Figure 5B:
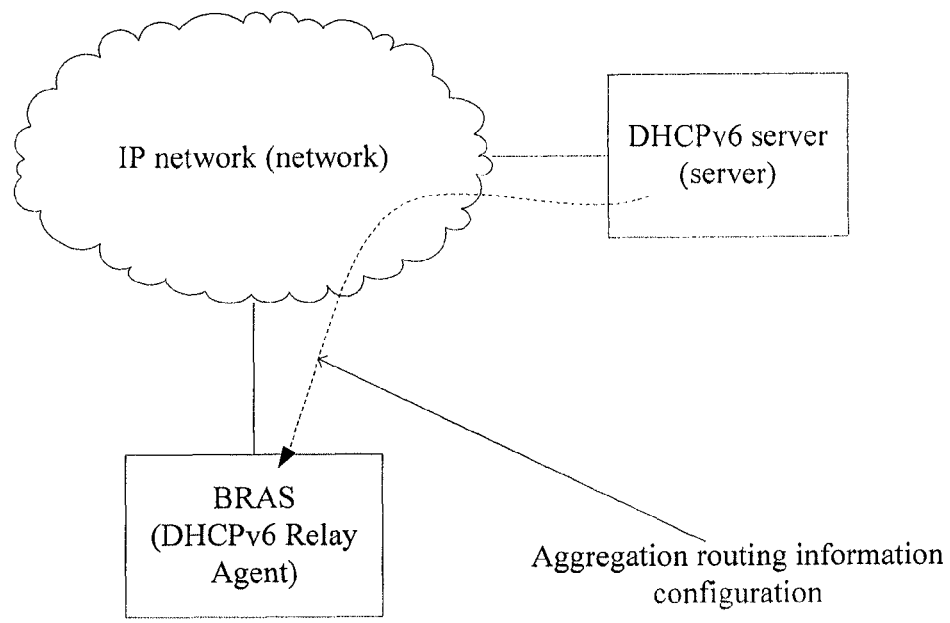
FIG. 5(b) is a network construction diagram applied in the method for implementing routing aggregation shown in FIG. 5(a)

In the present embodiment, as shown in FIG. 1 and FIG. 5(b), the DHCP server sends a message to the DHCPv6 relay agent. In FIG. 1, the message is a relay reply message which comprises the information about the prefix pool or the aggregation routing destination address information; while in FIG. 5(b), the message is a configuration message, which comprises the information about the prefix pool or the aggregation routing destination address information. FIG. 1 and FIG. 5(b) are network constructions comprising DHCPv6 relay agent (DHCPv6 Relay Agent) and DHCPv6 server. In FIG. 1 and FIG. 5(b), the DHCPv6 relay agent (DHCPv6 Relay Agent) is a BRAS and the DHCPv6 relay agent is connected to a NSP network in which the DHCPv6 server is configured.

Specifically, the method that the network construction implements routing aggregation as shown in FIG. 1 is achieved on the basis of the DHCPv6 PD assigning IPv6 address prefixes provided in the preceding description.

Figure 6A:
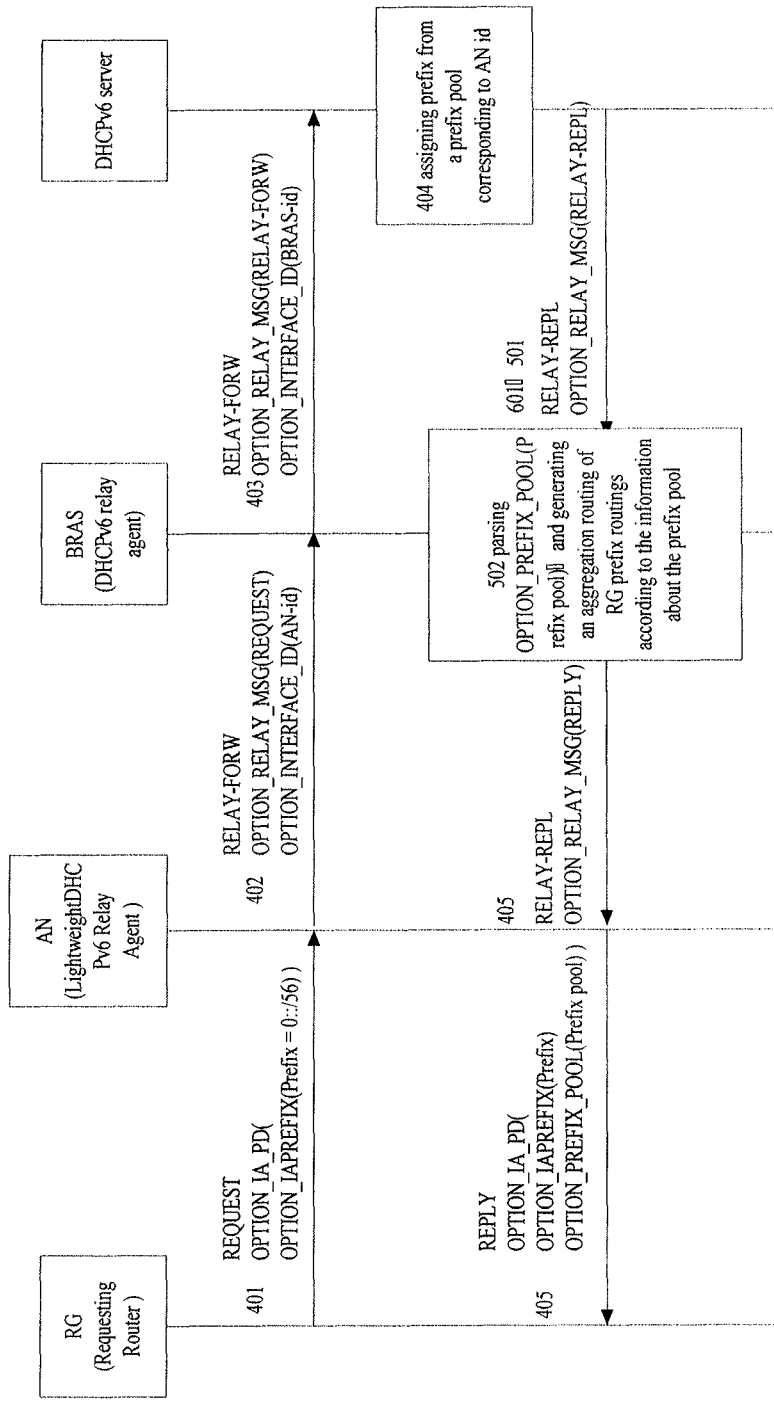
FIG. 6(a) is flowchart two of a method for implementing routing aggregation provided by another embodiment of the present invention.

As shown in FIG. 6(a) and FIG. 7(a), step 501 is comprised after the step 403, and before the step 501, further comprising:

Step 601, the DHCPv6 server generating a reply (REPLY) message when it is parsed that the relay forwarding message comprises a prefix designating identity alliance information (i.e. OPTION_IA_PD option), wherein the reply message comprises the information about address prefixes and the prefix pool, and the information about the prefix pool is content of a OPTION_PREFIX_POOL prefix pool option which is as shown in table 4.

TABLE 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    OPTION_PREFIX_POOL     |          option-length            |
+-+-+-+-+-+-+-+-+-+-+-+-+-+-+-+-+-+-+-+-+-+-+-+-+-+-+-+-+-+-+-+-+
|  prf-len-pool |                                               |
+-+-+-+-+-+-+-+-+                                               |
|                        IPv6 prefix                            |
|                        (16 octets)                            |
|                                                               |
|                                                               |
|                                                               |
|               +-+-+-+-+-+-+-+-+-+-+-+-+-+-+-+-+-+-+-+-+-+-+-+-+
|               |
+-+-+-+-+-+-+-+-+
``` where OPTION_PREFIX_POOL is an option code; option-length is an option length and is measured in octets, whose value is normally 17; prf-len-pool is a prefix length of the prefix pool and is measured in octets; and IPv6 prefix is a IPv6 prefix pool.

In the present embodiment, the information about the prefix pool serves as content of the OPTION_PREFIX_POOL option; the OPTION_IAPREFIX option and the PTION_PREFIX_POOL option, which are generated in the process of assigning IPv6 address prefixes in the above-mentioned manner of DHCPv6 PD, serve as the content of the OPTION_IA_PD option and encapsulate the OPTION_IA_PD option as a reply (REPLY) message.

The step 501 specifically comprises: the DHCPv6 server encapsulates the reply (REPLY) message as a relay reply (RELAY-REPL) message and sends the relay reply (RELAY-REPL) message to the DHCPv6 relay agent.

Figure 6B:
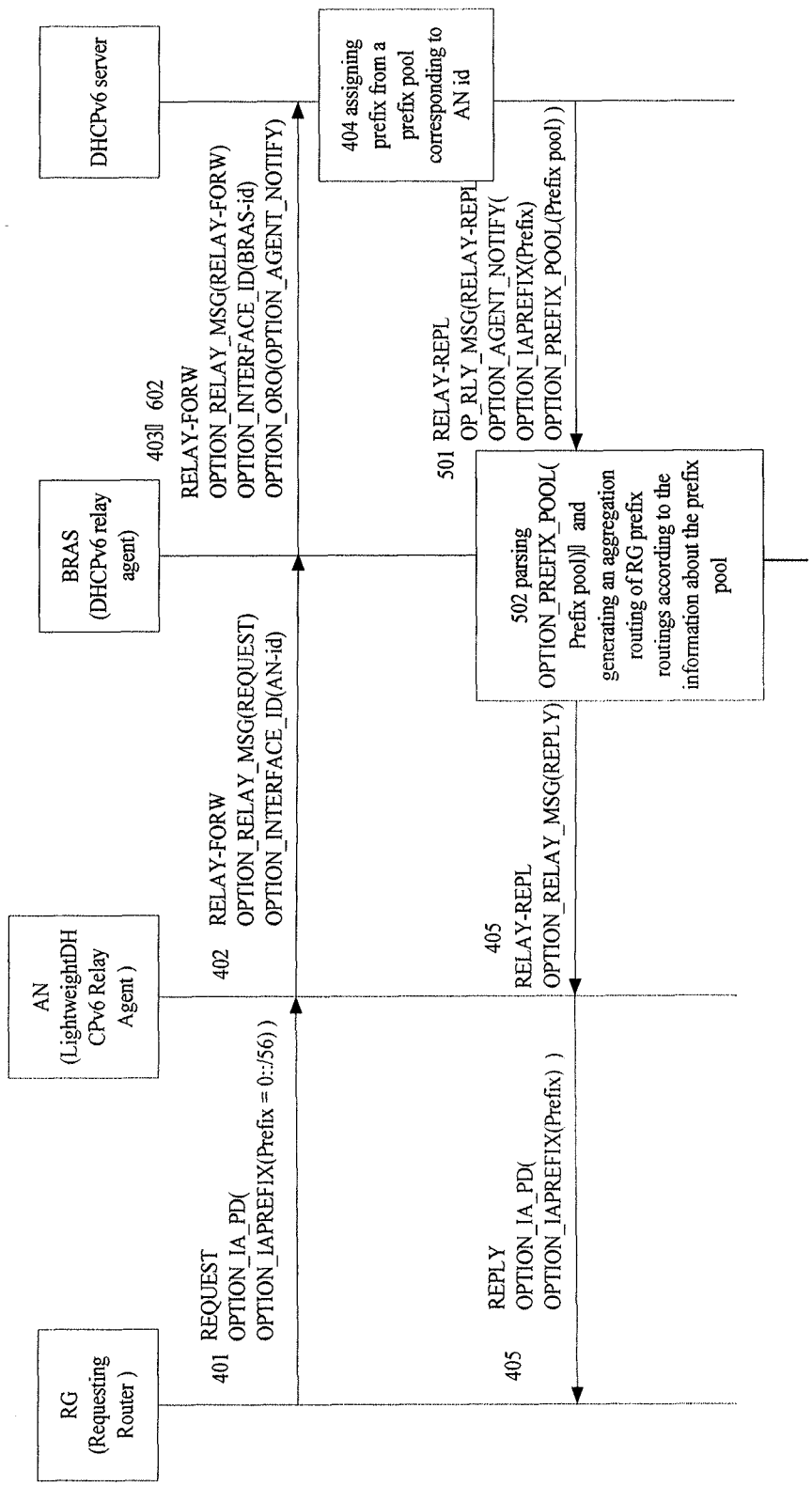
FIG. 6(b) is flowchart three of a method for implementing routing aggregation provided by another embodiment of the present invention.

Or as shown in FIG. 6(b) and FIG. 7(b), step 501 is comprised after the step 402, and before the step 501, further comprising:

Step 602, the DHCPv6 relay agent sends a second relay forwarding (RELAY-FORW) message to the DHCPv6 server, wherein the second relay forwarding (RELAY-FORW) message comprises a requesting agent notification option.

In the present embodiment, the DHCPv6 relay agent, such as a BRAS, adds an OPTION_ORO (option request option) option of the requesting agent notification option (OPTION_AGENT_NOTIFY) in the second relay forwarding (RELAY-FORW) message.

The step 501 specifically comprises: the DHCPv6 server sending the information about the prefix pool to the DHCPv6 relay agent through a relay reply (RELAY-REPL) message when it is checked that the second relay forwarding (RELAY-FORW) message comprises the requesting agent notification option.

In the present embodiment, the DHCP server receives the second relay forwarding (RELAY-FORW) message sent by the DHCPv6 relay agent, such as a BRAS, and parses the second relay forwarding (RELAY-FORW) message; if the DHCP server determines that there is an OPTION_ORO (option request option) option of the requesting agent notification option (OPTION_AGENT_NOTIFY), the DHCP server serves the information about the prefix pool as the content of the OPTION_PREFIX_POOL option; and the OPTION_PREFIX_POOL option which serves as one of the content of the OPTION_AGENT_NOTIFY option, is sent to the DHCPv6 relay agent through the relay reply (RELAY-REPL) message.

Figure 6C:
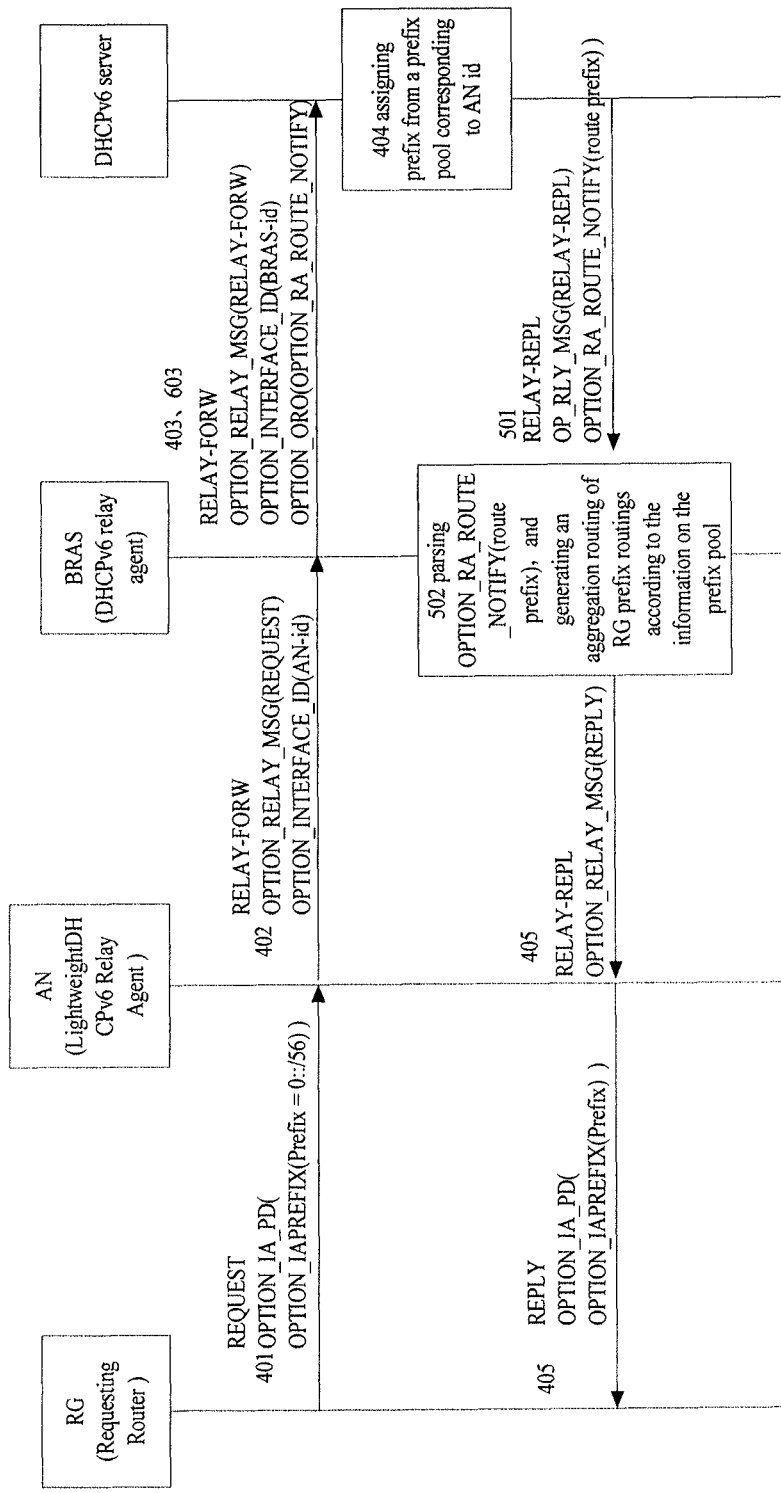
FIG. 6(c) is flowchart four of a method for implementing routing aggregation provided by another embodiment of the present invention.

Or as shown in FIG. 6(c) and FIG. 7(c), step 501 is comprised after the step 402, and before the step 501, further comprising:

Step 603, the DHCPv6 relay agent sends the second relay forwarding (RELAY-FORW) message to the DHCPv6 server, wherein the second relay forwarding (RELAY-FORW) message comprises a requesting relay agent route notification option.

In the present embodiment, the DHCPv6 relay agent, such as a BRAS, adds an OPTION_ORO (option request option) option of the requesting relay agent route notification option (OPTION_RA_ROUTE_NOTIFY) in the second relay forwarding (RELAY-FORW) message.

The step 501 specifically comprises: when it is checked that the second relay forwarding (RELAY-FORW) message comprises a requesting relay agent route notification option, the DHCPv6 server generates the aggregation routing destination address information according to the information about the prefix pool, and sends the aggregation routing destination address information to the DHCPv6 relay agent through a relay reply (RELAY-REPL) message.

In the present embodiment, the DHCPv6 server receives the second relay forwarding (RELAY-FORW) message sent by the DHCPv6 relay agent, such as a BRAS, and parses the second relay forwarding (RELAY-FORW) message; if it is checked that an OPTION_ORO (option request option) option of the requesting relay agent route notification option (OPTION_RA_ROUTE_NOTIFY) exists in the second relay forwarding (RELAY-FORW) message, the DHCPv6 server generates the aggregation routing destination address information according to the information about the prefix pool and sends the aggregation routing destination address information as the content of the relay agent route notification option (OPTION_RA_ROUTE_NOTIFY) to the DHCPv6 relay agent through a relay reply (RELAY-REPL) message.

The relay agent route notification option comprises an option code, an option length, prefix length of an aggregation routing destination address and prefix of an aggregation routing destination address. Specifically, the format of the relay agent route notification option is shown as table 5.

TABLE 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| OPTION_RA_ROUTE_NOTIFY |            option-length             |
+-+-+-+-+-+-+-+-+-+-+-+-+-+-+-+-+-+-+-+-+-+-+-+-+-+-+-+-+-+-+-+-+
| prefix-length |                                               |
+-+-+-+-+-+-+-+-+                                               |
|                          IPv6 prefix                          |
|                          (16 octets)                          |
|                                                               |
|                                                               |
|                                                               |
|                    +-+-+-+-+-+-+-+-+-+-+-+-+-+-+-+-+-+-+-+-+-+
|                    |
+-+-+-+-+-+-+-+-+-+-+
``` where OPTION_RA_ROUTE_NOTIFY is an option code; option-length is an option length and is measured in octets, whose value is normally 17; prefix-length is prefix length of an aggregation routing destination address and prefix length of the prefix pool is measured in octets; and IPv6 prefix is prefix of an aggregation routing destination address.

Figure 5C:
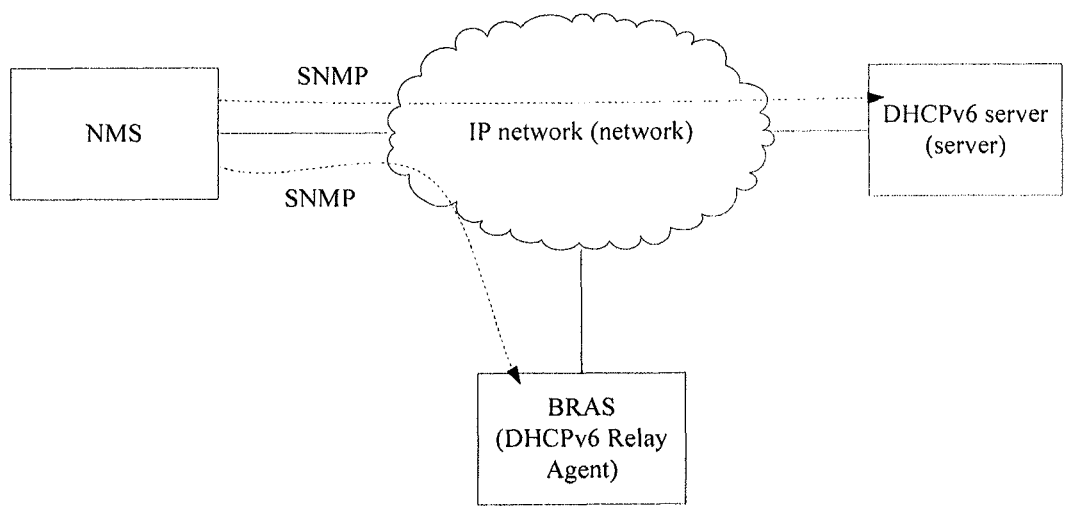
FIG. 5(c) is a network construction diagram applied in the method for implementing routing aggregation shown in FIG. 5(a)

Optionally, as shown in FIG. 5(c), a NMS sends a message to a DHCPv6 relay agent, wherein the message is a configuration message which comprises information about a prefix pool or aggregation routing destination address information. FIG. 5(c) is a network construction comprises a network management system (network management system, NMS), a DHCPv6 relay agent and a DHCPv6 server. In FIG. 5(c), the DHCPv6 relay agent (DHCPv6 Relay Agent) is a BRAS, and both of the NMS and the DHCPv6 relay agent (DHCPv6 Relay Agent) are connected to the NSP network in which a DHCPv6 server is configured. The configuration message may be sent from the NMS to the DHCPv6 relay agent by s Simple Network Management Protocol (SNMP).

Step 502, the DHCPv6 relay agent receives the message and generates an aggregation routing of the requesting router prefix routings according to the message.

In the present embodiment, a specific method that the DHCPv6 relay agent generates an aggregation routing of the requesting router prefix routings according to the message is that the DHCPv6 relay agent generates a destination address of the aggregation routing according to the information about the prefix pool or to the aggregation routing destination address information, and generates a next hop address of the aggregation routing according to the DHCPv6 relay agent network side interface address.

Specifically, as shown in FIG. 6(a), the step 502 is after the step 404 and the step 502 comprises:

The DHCPv6 relay agent parsing that information about the prefix pool exists in the reply (REPLY) message of the relay reply (RELAY-REPL) message, and generating an aggregation routing of the requesting router prefix routings according to the information about the prefix pool.

In the present embodiment, the DHCPv6 relay agent, such as a BRAS, receives a relay reply (RELAY-REPL) message sent by the DHCP server, and parses the relay reply (RELAY-REPL) message and determines that an OPTION_PREFIX_POOL option exists in the relay reply (RELAY-REPL) message; and generates an aggregation routing of a requesting router (such as a RG) prefix routings according to the information about the prefix pool in the OPTION_PREFIX_POOL option.

Alternatively, as shown in FIG. 6(b), the step 502 is after the step 404 and the step 502 comprises:

the DHCPv6 relay agent parsing that information about the prefix pool exists in the relay reply (RELAY-REPL) message, and generating an aggregation routing of the requesting router prefix routings according to the information about the prefix pool.

In the present embodiment, the DHCPv6 relay agent, such as a BRAS, receives a relay reply (RELAY-REPL) message sent by the DHCPv6 server, and parses an OPTION_PREFIX_POOL option in the OPTION_AGENT_NOTIFY option, as well as generates an aggregation routing of a requesting router (such as a RG) prefix routings according to the information about the prefix pool in the OPTION_PREFIX_POOL option.

Alternatively, as shown in FIG. 6(c), the step 502 is after the step 404 and the step 502 comprises:

the DHCPv6 relay agent parsing the relay reply (RELAY-REPL) aggregation routing destination address information, and generating an aggregation routing of the requesting router prefix routings according to the aggregation routing destination address information.

In the present embodiment, the DHCPv6 relay agent, such as a BRAS, receives a relay reply (RELAY-REPL) message sent by the DHCPv6 server, and parses the aggregation routing destination address information in the OPTION_RA_ROUTE_NOTIFY option, as well as generates an aggregation routing of a requesting router (such as a RG) prefix routings according to the aggregation routing destination address information.

The method for implementing routing aggregation provided by the embodiments of the present invention, as the message comprises information about a prefix pool which assigns address prefixes to the requesting routers access to the DHCPv6 relay agent or aggregation routing destination address information generated according to the information about the prefix pool, and an aggregation routing of requesting router prefix routings is generated according to the information about the prefix pool or the aggregation routing destination address information, the number of routings advertised on the DHCPv6 relay agent router has been greatly reduced and the problem that too many routings advertised on the DHCPv6 relay agent router leads to huge number of routing table entries in a backbone network in the prior art has been solved.

Figure 8A:
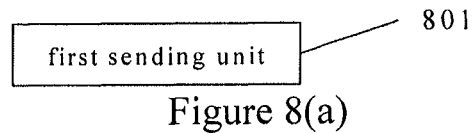
FIG. 8(a) is schematic diagram one of structure of a network communication apparatus provided by an embodiment of the present invention.

As shown in FIG. 8(a), a network communication apparatus provided in the embodiments of the present invention, comprises:

a first sending unit 801, configured to send a message to a dynamic host configuration protocol DHCPv6 relay agent, wherein the message comprises information about a prefix pool which assigns address prefixes to the requesting routers access to the DHCPv6 relay agent or aggregation routing destination address information generated according to the information about the prefix pool. Specific implementing methods may be executed as the step 201 shown in the FIG. 2 and will not be described in detail herein.

Figure 8B:
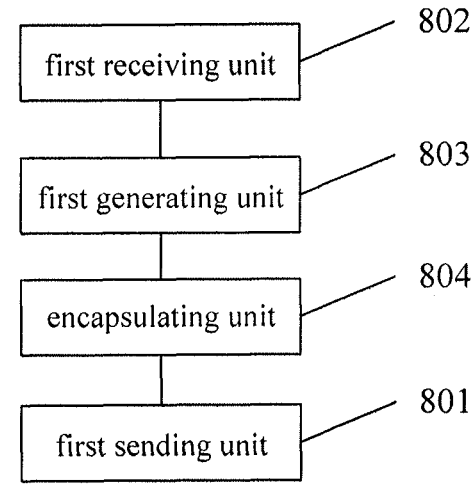
FIG. 8(b) is schematic diagram two of structure of a network communication apparatus provided by an embodiment of the present invention.
Figure 8C:
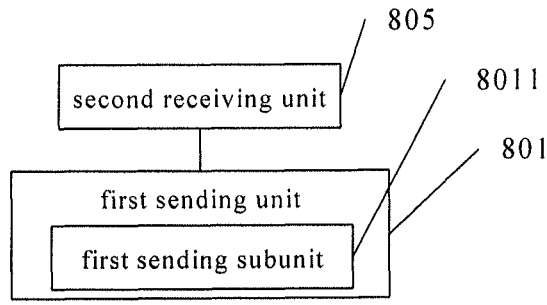
FIG. 8(c) is schematic diagram three of structure of a network communication apparatus provided by an embodiment of the present invention.
Figure 8D:
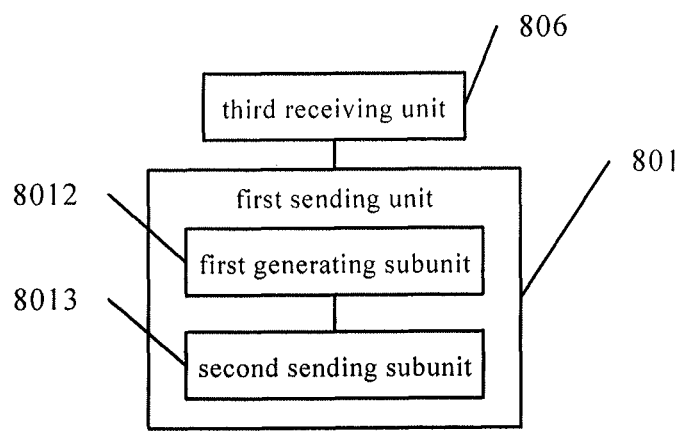
FIG. 8(d) is schematic diagram four of structure of a network communication apparatus provided by an embodiment of the present invention.

As shown in FIG. 8(b), additionally, the network communication apparatus further comprises:

a first receiving unit 802, configured to receive a relay forwarding message sent by the DHCPv6 relay agent. Specific implementing methods may be executed as the step 404 shown in the FIG. 4(a) and will not be described in detail herein;

a first generating unit 803, configured to generate a reply message when it is parsed that the relay forwarding message received by the first receiving unit comprises a prefix designating identity alliance information, wherein the reply message comprises the information about address prefixes and the prefix pool. Specific implementing methods may be executed as the step 501 shown in the FIG. 6(*a*) and will not be described in detail herein;

an encapsulating unit 804, configured to encapsulate the reply message generated by the first generating unit as a relay reply message. Specific implementing methods may be executed as the step 501 shown in the FIG. 6(*a*) and will not be described in detail herein.

As shown in FIG. 8(*c*), additionally, the network communication apparatus further comprises:

a second receiving unit 805, configured to receive a relay forwarding message sent by the DHCPv6 relay agent, wherein the relay forwarding message comprises a requesting agent notification option; specific implementing methods may be executed as the step 602 shown in the FIG. 6(*b*) and will not be described in detail herein.

The first sending unit 801, comprises:

a first sending subunit 8011, configured to send the information about the prefix pool to the DHCPv6 relay agent through a relay reply message when it is checked that the relay forwarding message comprises the request agent notification option.

As shown in FIG. 8(*d*), additionally, the network communication apparatus further comprises:

a third receiving unit 806, configured to receive a relay forwarding message sent by the DHCPv6 relay agent, wherein the relay forwarding message comprises an requesting relay agent route notification information; specific implementing methods may be executed as the step 603 shown in the FIG. 6(*c*) and will not be described in detail herein.

The first sending unit 801, comprises:

a first generating subunit 8012, configured to generate the aggregation routing destination address information according to the information about the prefix pool when it is checked that the relay forwarding message comprises the requesting relay agent route notification information;

a second sending subunit 8013, configured to send the aggregation routing destination address information generated by the first generating subunit to the DHCPv6 relay agent through a relay reply message.

The network communication apparatus for implementing routing aggregation provided by the embodiments of the present invention, as the message comprises information about a prefix pool which assigns address prefixes to the requesting routers access to the DHCPv6 relay agent or aggregation routing destination address information generated according to the information about the prefix pool, and an aggregation routing of requesting router prefix routings is generated according to the information about the prefix pool or the aggregation routing destination address information, the number of routings advertised on the DHCPv6 relay agent router has been greatly reduced and the problem that too many routings advertised on the DHCPv6 relay agent router leads to huge number of routing table entries in a backbone network in the prior art has been solved.

Figure 9A:
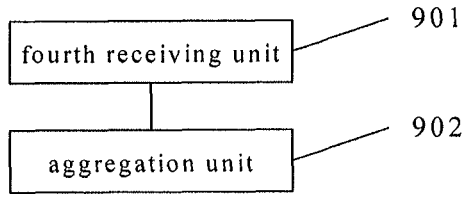
FIG. 9(a) is schematic diagram one of structure of an apparatus for implementing routing aggregation provided by an embodiment of the present invention.
Figure 9B:
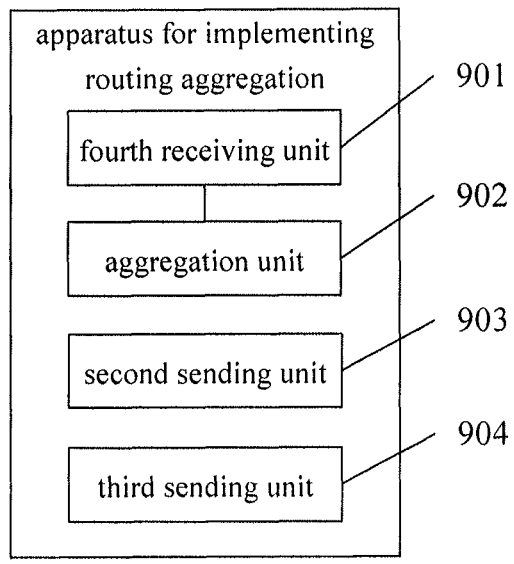
FIG. 9(b) is schematic diagram two of structure of an apparatus for implementing routing aggregation provided by an embodiment of the present invention.
Figure 9C:
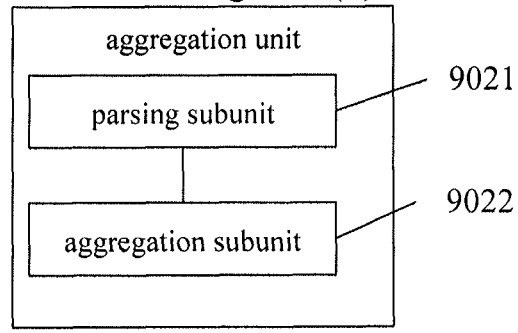
FIG. 9(c) is schematic diagram of structure of an aggregation unit of an apparatus for implementing routing aggregation shown in FIG. 9(b)

As shown in FIG. 9(*a*), an apparatus for implementing routing aggregation provided by the embodiments of the present invention, comprises:

a fourth receiving unit 901, configured to receive a message, wherein the message comprises information about a prefix pool which assigns address prefixes to the requesting routers access to the DHCPv6 relay agent or aggregation routing destination address information generated according to the information about the prefix pool; see the description on step 301 as shown in the FIG. 3 for specific implementing methods and will not be described in detail herein;

an aggregation unit 902, configured to generate an aggregation routing of requesting router prefix routings according to the message received by the receiving unit; see the description on step 302 as shown in the FIG. 3 for specific implementing methods and will not be described in detail herein.

In addition, as shown in FIG. 9(*b*), the apparatus for implementing routing aggregation, further comprises:

a second sending unit 903, configured to send a relay forwarding message to a dynamic host configuration protocol DHCPv6 server; and/or a third sending unit 904, configured to send a relay forwarding message to a DHCPv6 server, wherein the relay forwarding message comprises a requesting agent notification option or a requesting relay agent route notification option. See the description on the step 602 and step 603 as shown in the FIG. 6(*b*) and FIG. 6(*c*) for specific implementing methods and will not be described in detail herein.

In the present embodiment, the aggregation unit, as shown in FIG. 9(*c*), comprises:

a parsing subunit 9021, configured to parse that the information about the prefix pool or the aggregation routing destination address information exists in the reply message of messages received by the fourth receiving unit; see the description on the step 502 and step 502 as shown in the FIG. 6(*b*) and FIG. 6(*c*) for specific implementing methods and will not be described in detail herein;

an aggregation subunit 9022, configured to generate an aggregation routing of requesting router prefix routings according to the information about the prefix pool or the aggregation routing destination address information obtained by the parsing subunit. See the description on the step 502 and step 502 as shown in the FIG. 6(*b*) and FIG. 6(*c*) for specific implementing methods and will not be described in detail herein.

The apparatus for implementing routing aggregation provided by the embodiments of the present invention, as the message comprises information on a prefix pool which assigns address prefixes to the requesting routers access to the DHCPv6 relay agent or aggregation routing destination address information generated according to the information about the prefix pool, and an aggregation routing of requesting router prefix routings is generated according to the information about the prefix pool or the aggregation routing destination address information, the number of routings advertised on the DHCPv6 relay agent router has been greatly reduced and the problem that too many routings advertised on the DHCPv6 relay agent router leads to huge number of routing table entries in a backbone network in the prior art has been solved.

Figure 10:
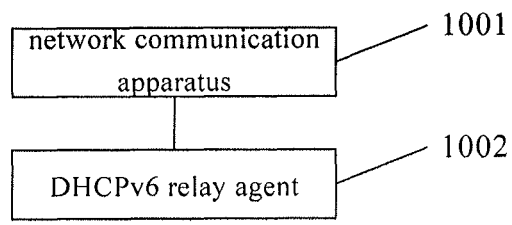
FIG. 10 is schematic diagram of structure of a system for implementing routing aggregation provided by an embodiment of the present invention.

As shown in FIG. 10, a system for implementing routing aggregation provided by the embodiments of the present invention, comprises:

a network communication apparatus 1001, configured to send a message to a DHCPv6 relay agent, wherein the message comprises information about a prefix pool which assigns address prefixes to the requesting routers access to the DHCPv6 relay agent or aggregation routing destination address information generated according to the information about the prefix pool;

a dynamic host configuration protocol DHCPv6 relay agent 1002, configured to receive a message, and generating an aggregation routing of requesting router prefix routings according to the message sent by the DHCPv6 server.

The system for implementing routing aggregation provided by the embodiments of the present invention, as the message comprises information about a prefix pool which assigns address prefixes to the requesting routers access to the DHCPv6 relay agent or aggregation routing destination address information generated according to the information about the prefix pool, and an aggregation routing of requesting router prefix routings is generated according to the information about the prefix pool or the aggregation routing destination address information, the number of routings advertised on the DHCPv6 relay agent router has been greatly reduced and the problem that too many routings advertised on the DHCPv6 relay agent router leads to huge number of routing table entries in a backbone network in the prior art has been solved.

The method, apparatus and system for implementing routing aggregation provided by the embodiments of the present invention can be applied in DHCPv6 network constructions.

With the preceding description of the implementation manners, a person having ordinary skill in the art may clearly appreciated that the present invention may be accomplished by means of software with essential hardware platform, and certainly, all of which may also be accomplished by hardware, though the former is better in most of situations. On the basis of such understanding, all or part of the technical solution of the present invention which contributes to the background technologies may be embodied in the form of a software product, wherein the software product may be applied to execute the method mentioned above. The computer software product may be stored in a storage medium such as ROM/RAM, disk, CD and the like, including various commands that enable a computer device (may be personal computer, server or internet device and so on) to execute the method that is described in the respective embodiments or some parts of the embodiments.

The foregoing description is only the specific implementation manner of the present invention, rather than the limits of the protection scope of the present invention, any modification or alteration that may be readily thought by the skilled person within the disclosed technologies of the present invention falls into the protection scope of the present invention. As a result, the protection scope of the present invention shall take the claims as a standard.

The invention claimed is:

1. A method for implementing routing aggregation, comprising:
sending, by a Dynamic Host Configuration Protocol version 6 (DHCPv6) server, a message to a DHCPv6 relay agent, wherein the DHCPv6 relay agent comprises one of a plurality of DHCPv6 relay agents, the aggregated routing destination address information is generated according to information about a prefix pool by the DHCPv6 server, wherein the prefix pool comprises a plurality of address prefixes and is divided into a plurality of parts which are assigned to the plurality of DHCPv6 relay agents, the prefix pool is shared by a plurality of requesting routers under the plurality of DHCPv6 relay agents, such that the DHCPv6 relay agent generates an aggregated routing of requesting router prefix routings according to aggregation routing destination address information in the message; wherein the aggregated routing destination address information comprises information about an aggregated prefix of address prefixes in a part, which is assigned to the DHCPv6 relay agent, of the prefix pool, and wherein the requesting router prefix routings comprise routings with address prefixes of requesting routers under the DHCPv6 relay agent as destination addresses, and the aggregated routing of requesting router prefix routings comprises a routing with the aggregated prefix as a destination address.

2. The method of claim 1, wherein the information about the prefix pool comprises a prefix length of the prefix pool and prefixes of an Internet Protocol IPv6 prefix pool.

3. The method of claim 1, wherein the message is a relay reply message, and before the sending a message to a DHCPv6 relay agent, further comprising:
receiving a relay forwarding message sent by the DHCPv6 relay agent;
generating a reply message when it is parsed that the relay forwarding message comprises a prefix designating identity alliance information, the reply message comprises the information about address prefixes and prefix pool; and
encapsulating the reply message as a relay reply message.

4. The method of claim 3, wherein the information about the prefix pool comprises a prefix length of the prefix pool and prefixes of an Internet Protocol IPv6 prefix pool.

5. The method of claim 1, wherein the message is a relay reply message, and before the sending a message to a DHCPv6 relay agent, further comprising:
receiving a relay forwarding message sent by a DHCPv6 relay agent, wherein the relay forwarding message comprises a requesting agent notification option; and
the sending a message to a DHCPv6 relay agent, comprising:
sending the information about the prefix pool to the DHCPv6 relay agent through a relay reply message when it is checked that the relay forwarding message comprises the requesting agent notification option.

6. The method of claim 5, wherein the information about the prefix pool comprises a prefix length of the prefix pool and prefixes of an Internet Protocol IPv6 prefix pool.

7. The method of claim 1, wherein the message is a relay reply message, and before the sending a message to a DHCPv6 relay agent, further comprising:
receiving a relay forwarding message sent by the DHCPv6 relay agent, wherein the relay forwarding message comprises a requesting relay agent route notification option; and
the sending a message to a DHCPv6 relay agent, comprising:
generating the aggregated routing destination address information according to the information about the prefix pool when it is checked that the relay forwarding message comprises the requesting relay agent route notification option; and
sending the aggregated routing destination address information to the DHCPv6 relay agent through a relay reply message.

8. The method of claim 7, wherein the aggregated routing destination address information comprises a prefix length of the aggregated routing destination address and prefixes of the aggregated routing destination address.

9. The method of claim 1, wherein the aggregated routing destination address information comprises a prefix length of the aggregated routing destination address and prefixes of the aggregated routing destination address.

10. A method for implementing routing aggregation, comprising:
receiving, by a Dynamic Host Configuration Protocol version 6 (DHCPv6) replay agent, a message, wherein the DHCPv6 relay agent comprises one of a plurality of DHCPv6 relay agents, the prefix pool comprises a plurality of address prefixes and is divided into a plurality of parts which are assigned to the plurality of DHCPv6 relay agents, the prefix pool is shared by a plurality of requesting routers under the plurality of DHCPv6 relay agents; and generating an aggregated routing of requesting router prefix routings according to aggregated routing destination address information in the message, wherein the aggregated routing destination address information comprises information about an aggregated prefix of address prefixes in a part, which is assigned to the DHCPv6 relay agent, of the prefix pool, the requesting router prefix routings comprises routings with address prefixes of requesting routers under the DHCPv6 relay agent as destination addresses, and the aggregated routing of requesting router prefix routings comprises a routing with the aggregated prefix as a destination address.

11. The method of claim 10, wherein the message is a configuration message, and the receiving a message, comprising:

receiving a configuration message sent by a network management system or a dynamic host configuration protocol DHCPv6 server, wherein the configuration message comprises the aggregated routing destination address information.

12. The method of claim 10, wherein the message is a relay reply message, the receiving a message, comprising:

receiving a relay reply message sent by the DHCPv6 server, wherein the relay reply message comprises the aggregated routing destination address information.

13. The method of claim 10, wherein before the receiving a relay reply message sent by the DHCPv6 server, further comprising:

sending a relay forwarding message to the DHCPv6 server; and the generating an aggregated routing of requesting router prefix routings according to the reply message, comprising:

generating an aggregated routing of requesting router prefix routings according to the information about the prefix pool when it is parsed that the reply message in the relay reply message comprises the information about the prefix pool.

14. The method of claim 12, wherein before the receiving a relay forwarding message sent by the DHCPv6 server, further comprising:

sending a relay forwarding message to the DHCPv6 server, wherein the relay forwarding message comprises a requesting agent notification option or a requesting relay agent route notification option; and the generating an aggregated routing of requesting router prefix routings according to the reply message, comprising:

generating an aggregated routing of requesting router prefix routings according to the aggregated routing destination address information when it is parsed that the reply message comprises a prefix pool option or a relay agent route notification option.

15. An apparatus for implementing routing aggregation, comprising circuits configured to:

receive a message, and generate an aggregated routing of requesting router prefix routings according to aggregated routing destination address information in the message, wherein the apparatus comprises one of a plurality of Dynamic Host Configuration Protocol version 6 (DHCPv6) relay agents, the prefix pool comprises a plurality of address prefixes and is divided into a plurality of parts which are assigned to the plurality of DHCPv6 relay agents, the prefix pool is shared by a plurality of requesting routers under the plurality of DHCPv6 relay agents, the aggregated routing destination address information comprises part of the information about the prefix pool, and the requesting router prefix routings comprise routings with address prefixes of requesting routers under the apparatus as destination addresses, and the aggregated routing of requesting router prefix routings comprises a routing with the aggregated prefix as a destination address.

16. The apparatus of claim 15, further comprising circuits configured to:

send a relay forwarding message to a dynamic host configuration protocol DHCPv6 server;

send a relay forwarding message to the DHCPv6 server;

parse that the aggregated routing destination address information is included in the message; and generate an aggregated routing of requesting router prefix routings aggregated in the prefix routing of the requesting router according to the aggregated routing destination address information, wherein the relay forwarding message comprises a requesting agent notification option or a requesting relay agent route notification option.

* * * * *